(12) United States Patent
Divo et al.

(10) Patent No.: US 8,132,909 B2
(45) Date of Patent: Mar. 13, 2012

(54) METHOD OF PREPARING AN OPHTHALMIC LENS TO BE FLUSH WITH A SURROUND OF AN EYEGLASS FRAME

(75) Inventors: Fabien Divo, Charenton le Pont (FR); Christian Joncour, Charenton le Pont (FR)

(73) Assignee: Essilor International (Compagnie Generale d'Optique), Charenton-le-Pont (FR)

( * ) Notice: Subject to any disclaimer, the term of this patent is extended or adjusted under 35 U.S.C. 154(b) by 346 days.

(21) Appl. No.: 12/596,773

(22) PCT Filed: Apr. 14, 2008

(86) PCT No.: PCT/FR2008/000518
§ 371 (c)(1),
(2), (4) Date: Oct. 20, 2009

(87) PCT Pub. No.: WO2008/142291
PCT Pub. Date: Nov. 27, 2008

(65) Prior Publication Data
US 2010/0134756 A1 Jun. 3, 2010

(30) Foreign Application Priority Data
Apr. 24, 2007 (WO) ................. PCT/FR2007/000694

(51) Int. Cl.
*G02C 13/00* (2006.01)
(52) U.S. Cl. ........................................ 351/178; 351/177
(58) Field of Classification Search ........... 351/177–178
See application file for complete search history.

(56) References Cited

U.S. PATENT DOCUMENTS

| 5,881,467 | A | 3/1999 | Clara et al. |
| 6,813,536 | B1 | 11/2004 | Gottschald |

FOREIGN PATENT DOCUMENTS

| DE | 198 04 542 | 8/1999 |
| EP | 0 819 967 | 1/1998 |
| EP | 0 851 265 | 7/1998 |
| EP | 1 092 502 | 4/2001 |

OTHER PUBLICATIONS

International Search Report Dec. 9, 2008, from corresponding PCT application.

*Primary Examiner* — Ricky Mack
*Assistant Examiner* — James Greece
(74) *Attorney, Agent, or Firm* — Young & Thompson

(57) ABSTRACT

A method of preparing an ophthalmic lens for mounting in a surround of an eyeglass frame, the surround presenting a generally profiled shape with an inside face provided with a first engagement ridge or groove and lying between a rear margin for being turned towards the face of the wearer of the eyeglass frame and an opposite front margin, the method including: acquiring the three-dimensional shape of an acquired longitudinal profile running along the inside face; and shaping the ophthalmic lens so as to form on its edge face a second engagement ridge or groove extending along a deduced longitudinal profile of three-dimensional shape calculated as a function of the shape of the acquired longitudinal profile. The method further includes acquiring a geometrical characteristic that relates to the position of the engagement ridge or groove relative to the front and/or rear margin of the frame, the shape of the deduced longitudinal profile then also being calculated as a function of the geometrical characteristic.

15 Claims, 2 Drawing Sheets

METHOD OF PREPARING AN OPHTHALMIC LENS TO BE FLUSH WITH A SURROUND OF AN EYEGLASS FRAME

TECHNICAL FIELD TO WHICH THE INVENTION RELATES

The present invention relates in general to the field of eyeglasses and more particularly to acquiring the shape of a surround of a rimmed or half-rimmed eyeglass frame for the purpose of machining an ophthalmic lens for mounting on said eyeglass frame.

More particularly, the invention relates to a method of preparing an ophthalmic lens for mounting in a surround of an eyeglass frame, the surround presenting a generally profiled shape with an inside face provided with a first engagement ridge or groove and lying between a rear margin for being turned towards the face of the wearer of the eyeglass frame and an opposite, front margin, the method comprising: a first acquisition step of acquiring the three-dimensional shape of an acquired longitudinal profile running along said inside face; and a step of shaping the ophthalmic lens so as to form on its edge face a second engagement ridge or groove extending along a deduced longitudinal profile of three-dimensional shape that is calculated as a function of the shape of said acquired longitudinal profile.

TECHNOLOGICAL BACKGROUND

Part of the skill of an optician consists in mounting a pair of correcting ophthalmic lenses on an eyeglass frame selected by a wearer. Such mounting comprises three main operations:

acquiring the shape of a surround of the eyeglass frame;

centering the lens, which consists in positioning and in orienting said lens appropriately in front of the corresponding eye of the wearer; and then machining the lens which consists in cutting away or shaping its outline to the desired shape, given the shape of the surround and the defined centering parameters.

The specific aim of the optician is to shape the ophthalmic lens so that it can be fitted mechanically to the shape of the surround of the selected frame, while ensuring that the lens performs the optical function for which it is designed as well as possible.

With rimmed eyeglass frames, the surround completely surrounds the outline of the lens and is referred to as a rim. Shaping includes a beveling operation that consists in forming all along the edge face of the lens an engagement ridge that is to engage in a groove, commonly referred to as a bezel, running around the inside face of the rim of the eyeglass frame.

With half-rimmed eyeglass frames, the surround goes around only a fraction of the outline of the lens and is referred to as a half-rim. Shaping then comprises a grooving operation consisting in forming along the edge face of the lens an engagement groove, with a fraction thereof being designed to be engaged on a ridge running around the inside face of the half-rim of the eyeglass frame. The lens is held against the half-rim by a string that is connected to the end of the half-rim and that is received in the remaining fraction of the engagement groove.

Generally, in order to ensure that the engagement ridge (or the engagement groove) does not overlie to the front or rear of the edge face of the lens, the optician machines the lens so that the engagement ridge (or the engagement groove) lies substantially halfway across the width of its edge face.

Nevertheless, it is found that once the pair of eyeglasses has been assembled, it does not always present a pleasing appearance, because the positioning of the lenses in the rims of the frame as determined by the above-mentioned technical constraints lead to possible differences in the thicknesses or even in the general curvatures of the two lenses, and to differences in thickness between the edge of the lens and the corresponding rim of the frame. This is particularly widespread since frames come in a very wide variety of shapes.

OBJECT OF THE INVENTION

In order to remedy the above-mentioned drawback of the prior art, the present invention proposes a novel method of preparing lenses that enables an ophthalmic lens to be machined so that the periphery of its front face lies at a pleasing distance from the front or rear margin of the surround of the eyeglass frame.

More particularly, the invention proposes a method of preparation as defined in the introduction, wherein provision is made for a second acquisition step of acquiring a geometrical characteristic relating to the position of the first engagement ridge or groove relative to said front and/or rear margin in an axial direction substantially perpendicular to a general plane of the eyeglass frame, and wherein the shape of the deduced longitudinal profile is also calculated as a function of said geometrical characteristic.

To provide a pleasing appearance, it is desirable to position the ophthalmic lens in the surround of the eyeglass frame in such a manner that its front face extends at a known distance, preferably a distance that is constant and zero, from the front margin of the surround.

To do this, in practice, the second step of acquiring the geometrical characteristic which corresponds to the distance between the first engagement groove (or the first engagement ridge) and the front margin of the surround is performed, and then the lens is machined during the shaping step in such a manner that the second engagement ridge (or engagement groove) extends at a distance from the front face of the lens that is substantially equal to said geometrical characteristic.

According to a first advantageous characteristic of the invention, said geometrical characteristic comprises a distance relating to the position of the first engagement ridge or groove relative to said front and/or rear margin at at least one given cross-section of the surround.

As a result, during the shaping step, the second engagement ridge (or engagement groove) is made in such a manner as to extend at a distance from the front face of the lens that remains substantially equal to the distance acquired along its outline. Thus, once the ophthalmic lens has been engaged in its surround, its front face lies substantially flush with the front margin of the surround over its entire periphery.

In a variant, said geometrical characteristic comprises distances relating to the position of the first engagement ridge or groove relative to said front and/or rear margin at at least ten given cross-sections of the surround.

A surround for an eyeglass frame generally presents a section that is not uniform along its length, and may for example be slightly twisted. The distance between the first engagement groove (or first engagement ridge) and the front margin of the surround along the main axis therefore varies.

In this variant, said distance is therefore acquired at a plurality of sections of the surround so as to take account of these variations during the shaping step.

By means of the invention, it is possible in particular to acquire said distance at a multitude of points around the outline of the surround, and subsequently to shape the lens and/or make the optical faces of the lens to measure (by machining or by shaping material) in such a manner that, once engaged in the surround, its front face comes flush as well as possible with the front margin of the surround all away around its periphery.

DETAILED DESCRIPTION OF AN EMBODIMENT

The following description with reference to the drawings, given by way of non-limiting example, makes it clear what the invention consists in and how it may be reduced to practice.

Figure 1:
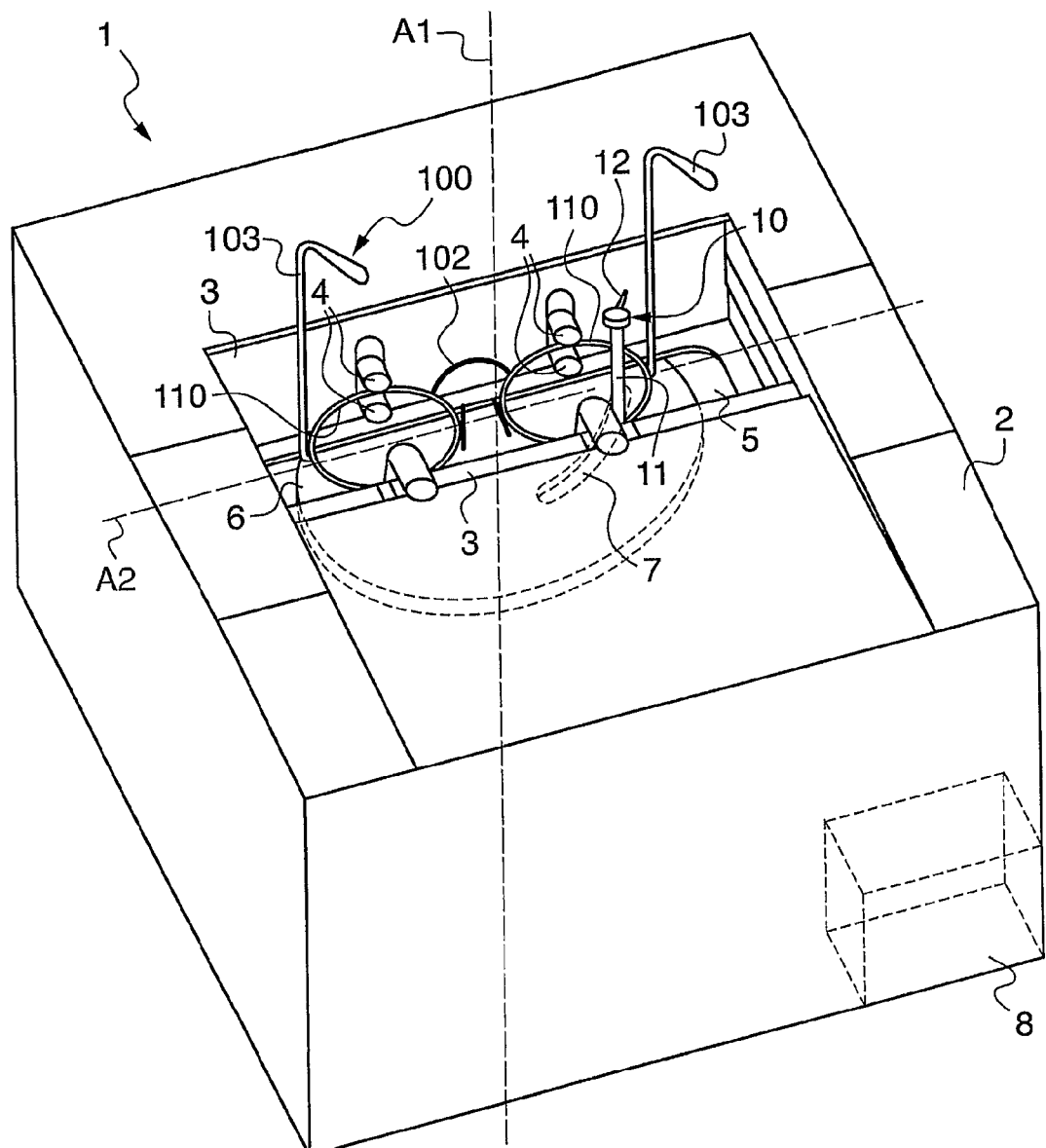
FIG. 1 is a perspective view of an outline reader appliance of the invention receiving a rimmed eyeglass frame having two rims.

The object of the present invention is to improve the appearance of the engagement between an ophthalmic lens and a surround (rim or half-rim) of a rimmed or half-rimmed eyeglass frame.

This description relates more particularly to rimmed eyeglass frames 100 (FIG. 1) having two rims 110 that are connected together by a bridge 102, and each of which is fitted with a temple 103.

The rims 110, also referred to as "surrounds", may present a variety of shapes (square, oval, elongate, . . . ). It should be understood that using the term "rim" is not in any way limiting as to the shape of the element in question. The term "rimmed frame" is thus used in contrast to "drilled frame" which is used to designate frames having a bridge and two temples, but not having rims.

A general plane (not shown) can be defined relative to such a rimmed eyeglass frame 100, which general plane is orthogonal to the two temples 103 of the eyeglass frame 100 when they are in the deployed position, and is tangential to the bridge 102 of the frame.

Each rim 110 is generally profiled in shape, having an inside face 114 bordered by two margins 115 and 116, comprising a rear margin 116 on the same side of the rim as the branches 103, and a front margin 115 opposite thereto. The rear margin 116 is thus intended to face towards the face of the wearer of the eyeglass frame 100.

Figure 3:
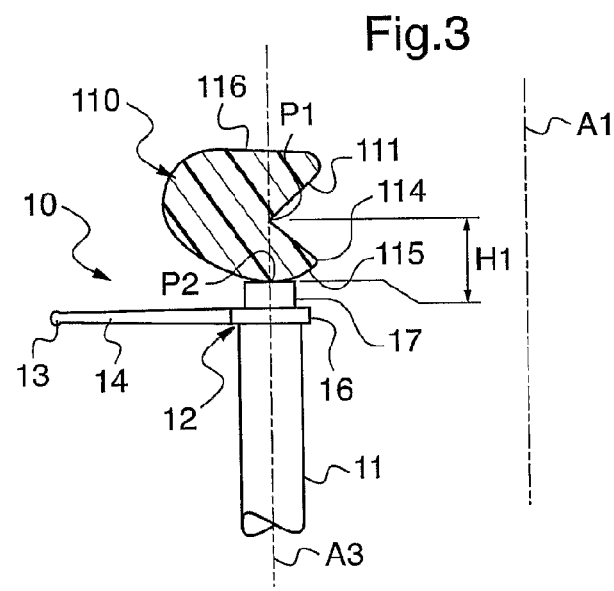
FIG. 3 is a section view of the feeler of the outline reader appliance of FIG. 1 shown feeling the rear margin of the rims.
Figure 4:
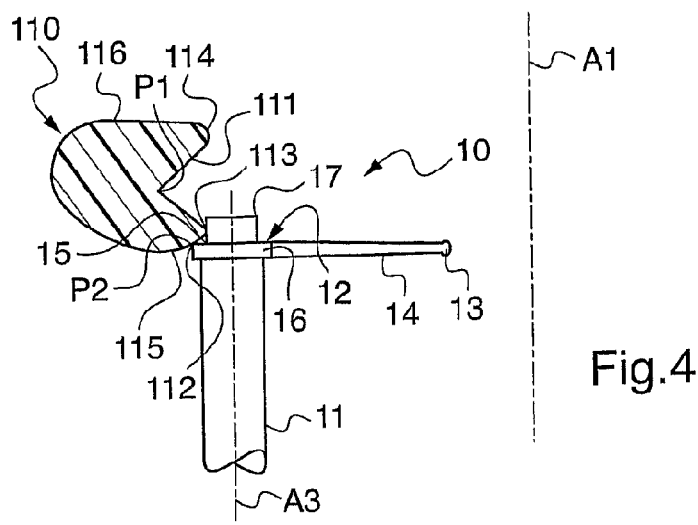
FIG. 4 is a section view of the feeler of the outline reader appliance of FIG. 1 fitted with a bearing shoe engaged against one of said rims.

Conventionally, as shown in FIGS. 3 and 4, the inside face 114 of each rim 110 has an engagement groove running therealong, here of V-shaped section, and commonly referred to as a bezel 111.

The bezel 111 extends along a curvilinear acquired longitudinal profile P1. This acquired longitudinal profile P1 corresponds to one of the curves traced along the bezel on one and/or the other of its flanks and that is substantially parallel to or coincides with the bottom of the bezel. Here it corresponds to the curve that runs along the bottom of the bezel 111.

Figure 2:
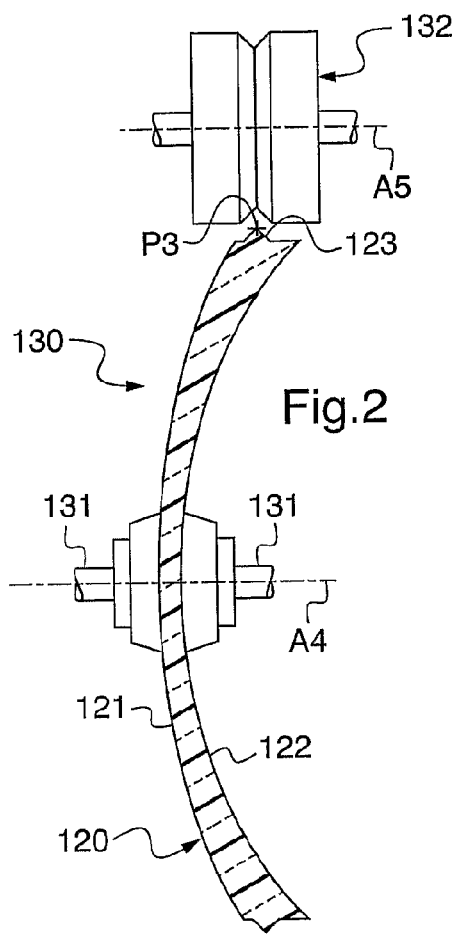
FIG. 2 is a diagrammatic view of a shaper appliance.

As shown in FIG. 2, the ophthalmic lens 120 for engaging in the corresponding rim 110 of the eyeglass frame presents a front optical face 121 that is convex and a rear optical face 122 that is concave. As shown in this figure, the ophthalmic lens 120 has already been machined and on its edge face it includes an engagement ridge 123 for engaging in the bezel 111 of the rim 110.

This engagement ridge 123 extends along a deduced longitudinal profile P3 that is curvilinear and it presents a uniform section that is V-shaped. The deduced longitudinal profile P3 corresponds to a line that runs along the engagement ridge, i.e. a curve that extends along one and/or the other of the flanks of the engagement rim 123 and that is substantially parallel to or coincides with the peak of the engagement ridge. In this example, it coincides with the peak of the engagement ridge 123.

As explained in greater detail below, the three-dimensional shape of this deduced longitudinal profile P3 (as a function of which the ophthalmic lens is machined) is deduced from the three-dimensional shape of the acquired longitudinal profile P1 of the bezel 111 of the rim 100 and as a function of a geometrical characteristic H1 (FIG. 3) that relates to the position of the bezel 111 relative to the front margin 115 of the rim 110.

Device

In order to acquire the three-dimensional shape of the acquired longitudinal profile P1 and said geometrical characteristic H1, it is possible to use an outline reader appliance 1, for example the appliance shown in FIG. 1.

This appliance comprises a structure 5 covered by a top cover 2 and serving to receive the eyeglass frame 100.

The structure 5 includes means for holding the eyeglass frame 100, which means are formed by two movable jaws 3 associated with pairs of studs 4 suitable for clamping the rims 110 of the eyeglass frame 100.

The outline reader appliance 1 also has a feeler 10 provided with a support rod 11 of longitudinal axis A3 and a reader head 12 adapted to follow the acquired longitudinal profile P1 of the rim 110 of the eyeglass frame 100 by keeping in contact therewith while turning about an axis of rotation A1.

For this purpose, the feeler 10 can move with three degrees of freedom relative to the structure 5.

Two particular arrangements of the reader appliance are described below that enable the feeler to have these various degrees of freedom, however these arrangements are merely two embodiments amongst others of the reader appliance.

In the arrangement shown in FIG. 1, the outline reader appliance 1 has a plate (not shown) capable of moving in translation on the structure 5 along a transfer axis A2. A turntable 6 is mounted on the plate. The turntable 6 is suitable for taking up two positions along the transfer axis A2, each in register with one of the two rims 110 of the eyeglass frame 100.

The turntable 6 possesses an axis of rotation A1 defined as the axis normal to the front face of the turntable 6 and passing through its center. It is suitable for pivoting about this axis relative to the plate. The turntable 6 also includes a circularly arcuate oblong slot 7 through which the feeler 10 projects.

The outline reader appliance 1 also includes actuator means for moving the plate along the transfer axis A2, for causing the turntable 6 to turn about its axis of rotation 1, for causing the support rod 11 of the feeler 10 to slide along the slot 7, and for modifying the height of the feeler head 12 relative to the plane of the turntable 6.

Finally, the outline reader appliance 1 includes an electronic and/or computer device 8 serving firstly to control the actuator means of the outline reader appliance 1, and secondly to acquire and store the successive positions of the reader head 12 of the feeler 10.

To summarize, the three degrees of freedom in movement of the feeler 10 in this arrangement comprise freedom to move radially R so that the feeler 10 can move towards or on the contrary away from the axis of rotation A1, freedom of the feeler 10 to move circumferentially THETA [theta] in pivoting about the axis of rotation A1, and freedom to move axially Z so that the feeler 10 can move up or down relative to the plane of the front face of the turntable 6.

As shown in FIGS. 3 and 4, the feeler 10 is fitted with a read head 12 including a feeler finger 14. More precisely, in this example, the read head 12 has a collar 16 mounted at the end of the support rod 11 and surmounted by a peg 17.

The feeler finger 14 extends from the outside face of the collar 16. It is in the form of a point 14 that extends perpendicularly to the longitudinal axis A3 of the support rod 11 and that presents a spherical endpiece 13. The endpiece 13 is for inserting in the bottom of the bezel 111 of the rim 110 and for sliding along the bezel 111 so as to read the shape of the acquired longitudinal profile P1 of the bezel 111. In a variant, the feeler finger could be of some other shape, such as a cylindrical rod or a blade pivoting in a direction orthogonal to the longitudinal axis A3 of the support rod 11. In a variant, its endpiece could be rotatably mounted on the point, so that instead of sliding along the rim, it rolls therealong.

The collar 16 and the peg 17 are circularly cylindrical about the longitudinal axis A3 and they present different diameters. The peg 17 thus constitutes a piece of section that is smaller than that of the collar 16, thus defining a shoulder 15 around the entire periphery of the collar 16.

In this embodiment, the shoulder 15 forms a V-shaped bearing shoe 15 adapted to engage said rim 110 so as to slide therealong (FIG. 4).

To do this, as shown in FIG. 4 and as described in greater detail below, the read head 12 is controlled in such a manner that the feeler finger 14 faces inwards, i.e. towards the axis of rotation A1 throughout the time the rim 110 is being felt by means of the bearing shoe 15.

By way of example, for this purpose, the read head 12 may present freedom to move in pivoting so as to be capable of presenting the bearing shoe 15 facing towards the rim 110 without the feeler finger 14 interfering with the frame 100. In a variant, the outline reader appliance need not be provided with this freedom to move in pivoting. Provision could then be made for the read head to be removable and to be manually mounted on the support rod in two different orientations. Provision could also be made for two interchangeable read heads, one carrying the feeler finger and the other carrying the bearing shoe.

In a variant, in order to simplify the algorithms for controlling the feeler 10, provision could be made for the read head 12 to be controlled to have the feeler finger 14 facing outwards, in similar manner to controlling the feeler finger while it is acquiring the shape of the bezel 111 by means of the feeler finger 14. The above-mentioned bearing shoe is then formed by the side face of the peg and by the top face of the feeler finger 14.

In an embodiment that is not shown in the figures, the read head of the feeler need not have a bearing shoe.

The second arrangement for the outline reader appliance is not shown in the figures. By way of example, such an outline reader appliance is described in document EP 0 291 378 and in document U.S. Pat. No. 4,995,170. In this arrangement, the feeler has three degrees of freedom to move in translation so as to move in all three dimensions of three-dimensional space. In particular, it includes means for actuating the feeler so as to move it along three mutually orthogonal directions.

In this embodiment, since the feeler does not pivot about an axis of rotation, it is necessary for it to present circular symmetry to enable it to feel all of the bottom of the bezel. For this purpose, its read head may be in the form of a thin disk with its edge face being adapted for insertion into the bezel.

In order to prepare the ophthalmic lens 120, it is also known to make use of a shaper appliance 130 that does not form the specific subject matter of the present invention. Such a shaper appliance is well known to the person skilled in the art, and is described for example in document U.S. Pat. No. 6,327,790 or as sold by the Applicant under the trademark Kappa CTD.

As shown in FIG. 2, such a shaper appliance 130 generally comprises support means, constituted in this example by shafts 131 for holding and driving the ophthalmic lens 120 in rotation about a blocking axis A4. Such a shaper appliance also has shaper means, constituted in this example by a machining tool 132 that is mounted to rotate about a machining axis A5. In this example, the axis A5 is substantially parallel to the blocking axis A4, but it could equally well be inclined relative thereto.

The machining tool 132 and/or the shafts 131 are provided with two degrees of freedom to move relative to each other, one degree of freedom that is radial enabling the spacing between the machining axis A5 and the blocking axis A4 to be modified, and another degree of freedom to move in axial translation along an axis parallel to the blocking axis A4.

The shaper appliance 130 also includes an electronic and/or computer device (not shown) that is provided firstly with means for communicating with the electronic and/or computer device 8 of the outline reader appliance 1, and secondly with means for controlling the degrees of freedom of the shafts 131 and the machining tool 132 to move relative to one another. For each angular position of the lens 120 about the blocking axis A4, the electronic and/or computer device serves in particular to control the radial spacing between the machining tool 132 and the blocking axis A4, and also the axial position of the edge face of the lens relative to the working surface of the machining tool 132.

Specifically, the machining tool 132 is constituted by a shaped main grindwheel, i.e. a grindwheel presenting a recess, like a negative, presenting a machining profile that is complementary to the section of the engagement ridge 123 that is to be obtained in relief on the edge face of the lens for machining.

Method of Preparation

The method of preparing the ophthalmic lens is described below with reference to the outline reader appliance 1 shown in FIG. 1.

The method comprises four main steps. In particular, it comprises a first step of acquiring the shape of the acquired longitudinal profile P1 of the bezel 111, a second step of acquiring the geometrical characteristic H1, a step of deducing the shape of the deduced longitudinal profile P3 of the engagement ridge 123, and a step of shaping the ophthalmic lens 120 to have said deduced longitudinal profile P3.

During the first step, the eyeglass frame 10 selected by the future wearer is engaged in the reader appliance 1 (FIG. 1). For this purpose, the frame 100 is inserted between the studs 4 of the jaws 3.

The feeler, which is initially positioned in the center of the turntable 6, beneath the eyeglass frame 100, is then actuated to take up a position between two of the studs 4 of a jaw 3, in contact with the bezel 111, so as to be capable of feeling the corresponding rim 110 of the eyeglass frame 100.

Contact between the feeler finger 14 and the bottom of the bezel 111 is maintained by the actuator means exerting a radial return force on the feeler 10 that is directed towards the bezel 111. This radial return force thus makes it possible to avoid the feeler finger 14 returning along one or the other of the flanks of the bezel 111 and escaping therefrom.

The electronic and/or computer device 8 then controls the actuator means of the turntable 6 so that the feeler finger 14 of the feeler 10 moves continuously along the bottom of the bezel 111, remaining in contact with the bottom of the bezel 111 as a result of said radial return force.

During rotation of the turntable, the electronic and/or computer device 9 reads the three-dimensional coordinates of a plurality of points along the acquired longitudinal profile P1 of the bezel 111, e.g. 360 points, so as to store an accurate digital image of the profile.

At the end of this step, the feeler 10 is controlled to return to its initial position in the center of the turntable 6 and beneath the eyeglass frame 100.

This first step of acquiring the three-dimensional shape of the acquired longitudinal profile P1 could be performed differently in a variant.

For example, it could be performed by feeling the bezel 111 optically. Such optical feeling can be performed by acquiring a three-dimensional digital image of the eyeglass frame and by processing the digital image electronically so as to identify the position of the bezel and deduce therefrom the three-dimensional shape of the acquired longitudinal profile P1.

This first step of acquisition could also be performed by means of a database registry accessible to an optician's computer or with the help of a shared database registry accessible to the computers of a plurality of opticians working in premises that are remote from one another.

Under such circumstances, it is then preferable for the database registry to contain a plurality of records each associated with one particular type of eyeglass frame reference, i.e. generally an eyeglass frame model. Each record contains a reference to the type of eyeglass frame and shape data relating to the shape of a bezel bottom, which shape is common to all frames of the type. In practice, the reference includes the name of the eyeglass frame model, while the shape data is made up of a string of characters providing the three-dimensional coordinates of 360 points along the bottom edge of the above-mentioned bezel.

In order to acquire the shape of the acquired longitudinal profile P1, the optician causes the computer to send a request to the database registry to search for a corresponding record, i.e. to search for a record having a reference that corresponds to the reference of the eyeglass frame 100 selected by the wearer. Thereafter, once the record has been found, the register returns the corresponding stored shape memory to the optician's computer, which data corresponds in this instance to the 360 points of the acquired longitudinal profile P1.

Whatever the method of acquiring the acquired plurality profile P1, if the eyeglass frame 100 is not already in the reader appliance 1 prior to the second step, the optician engages it in the holder means 3, 4 of the appliance in order to acquire the geometrical characteristic H1.

This geometrical characteristic H1 can then be acquired in various ways.

In a first implementation, the geometrical characteristic H1 is acquired by feeling a cross-section of the bezel 111 and, in said cross-section, by acquiring the distance between the acquired longitudinal profile P1 and the front margin 115.

For this purpose, the electronic and/or computer device 8 initially controls, in combination, the actuator means for the turntable 6 and for the support rod 11 so that the feeler finger 14 of the feeler 10 comes into contact with the bottom of the bezel 111 at some given cross-section of the rim, i.e. at a predetermined point of the acquired longitudinal profile P1. By way of example, this point may correspond to the first acquired point of the acquired longitudinal profile P1.

Thereafter, the electronic and/or computer device 8 firstly controls the radial degree of freedom R of the feeler 10 so that it exerts a constant radial return force enabling its feeler finger 14 to remain in contact with the rim 110, and secondly controls the axial degree of freedom Z in such a manner that the feeler finger 14 slides in the given section of the rim against one of the flanks of the bezel 111 and then over the front margin 115 of the rim 110. When the feeler escapes from the rim, i.e. when the feeler finger is no longer in contact with the rim 110, the electronic and/or computer device 8 reads the height difference between the initial position of the feeler (at the bottom of the bezel 111) and the current position of the feeler (at the height of the rear margin 115 of the rim). It deduces therefrom the distance H1 between the bottom of the bezel 111 and the front margin 115 of the rim 110. This distance H1 then forms the above-mentioned geometrical characteristic.

In preparation for the third step, this distance H1 is then stored as the distance between the bottom of the bezel 111 and the front margin 115 at each cross-section of the rim 110.

In a second implementation, the geometrical characteristic H1 is acquired by feeling ten distinct cross-sections of the bezel 111 in the manner described and, at each of the ten cross-sections, by acquiring the distance between the acquired longitudinal profile P1 and the front margin 115 of the rim 110.

The above-mentioned ten sections are preferably regularly distributed along the rim 110.

The ten acquired distances H1 then form the above-mentioned geometrical characteristic.

It is then preferable for the electronic and/or computer device 8 to interpolate on the basis of these ten acquired distances H1 to approximate a distance H1 between the front margin 115 and the bottom of the bezel 111 at each cross-section of the rim 110. The result of this interpolation is then stored in preparation for the third step.

In a third implementation, shown in FIG. 3, the geometrical characteristic H1 is acquired by sliding the feeler 10 along a generally longitudinal line P2 of the front margin 115 of the rim 110.

Advantageously, this generally longitudinal feeling line P2 is selected to be in register with the first groove or engagement ridge 111, thus providing the advantage of feeling the front margin 115 close to the inside face 114 of the rim 110, and thus close to the zone where it is desired that the front face of the lens should be flush.

Specifically, the electronic and/or computer device 8 begins by controlling, in combination, the actuator means for the feeler 10 so that during a first stage the outside face of the feeler, i.e. specifically (but not necessarily) the end face of the peg 17, lies under the first felt or acquired point of the acquired longitudinal profile P1 (e.g. 1 centimeter (cm) below it) and so that, during a second stage, the support rod 11 of the feeler 10 comes into register with said first point. In this position "in register" with the first point, the longitudinal axis A3 of the support rod 11 passes through said first point.

Thereafter, the electronic and/or computer device 8 controls the axial degree of freedom Z of the feeler 10 so that it rises to come into contact with the front margin 115 of the rim 110. This axial freedom of movement Z is then controlled so that the feeler 10 exerts a constant axial return force enabling its end face to remain in contact with the rim 110.

Finally, the feeler 10 is controlled using its radial and circumferential degrees of freedom R and THETA and as a function of the shape of the acquired longitudinal profile P1 so that its end face slides along the front margin 115 of the rim 100.

More precisely, the feeler 10 is controlled to move at constant speed around the axis of rotation A1 in its circumferential freedom of movement THETA and it is simultaneously controlled in position along its radial freedom of movement R so that its longitudinal axis A1 remains in register with the acquired longitudinal profile P1. In this way, the end face of the feeler 10 slides along a generally longitudinal line P2 of said front margin 115.

In a variant, the front margin 115 of the frame could be felt by means of a different portion of the read head 12 of the feeler 10, e.g. using the feeler finger 14.

In another variant, the radial freedom of movement R of the feeler 10 may be controlled so that the support rod 11 of the feeler remains constantly, not in register with the acquired longitudinal profile P1, but rather in register with another longitudinal profile of the bezel, i.e. at a constant distance from the acquired longitudinal profile P1. In particular, provision can be made for the offset distance between the longitudinal axis A3 and the acquired longitudinal profile P1 to remain, throughout the feeling of the front margin 115, constantly equal to the radius of the end face of the feeler 10 plus 1 mm. Thus, the generally longitudinal line that is felt on the front margin 115 of the rim extends close to the inside face 114 of the rim 110. In this way, and as explained in greater detail below, the ophthalmic lens can be machined so that once it is engaged in the rim 110, the outline of its front face 121 lies level with the line of the front margin 115 that is beside the inside face 114 of the rim 110, in a manner that is particularly attractive.

When the arrangement of the reader appliance gives the feeler three degrees of freedom to move in translation, two of these degrees of freedom to move in translation enable the feeler to move in a plane substantially parallel to the general plane of the frame, and a third of these degrees of freedom enables the feeler to move orthogonally to said plane. With such an arrangement, in order to ensure that the feeler slides along a generally longitudinal line of the front margin of the rim, its position is controlled in application of its first two degrees of freedom as a function of the shape of said acquired longitudinal profile so that it moves along the front margin 115 of the rim 110, while remaining in register with the bottom of the bezel 111, and it is controlled to apply a return force along its third degree of freedom so as to remain in contact with the rim.

In any event, when the feeler 10 moves along the front margin 115 of the bezel, the electronic and/or computer device 8 reads the difference in height H1 between the bottom of the bezel 111 and the front margin 115 of the rim. More precisely, it reads this difference in level at each of the 360 felt or acquired points of the longitudinal profile P1. The set of these differences H1 then forms the above-mentioned geometrical characteristic.

In a variant, and as shown in FIG. 4, the feeler 10 may be caused to slide along a generally longitudinal line P2 of the front margin 115 of the rim 110, while controlling the position of only one of the three degrees of freedom of the feeler 10, as explained below.

In this variant, advantage is taken of the particular shape of the feeler 10, which by virtue of its bearing shoe 15 is suitable for sliding along the rim 110.

More precisely, the step of acquiring the geometrical characteristic H1 is performed by engaging the bearing shoe 15 against the rim 110 in such a manner that two bearing zones 112 and 113 of the bearing shoe 15 come into contact respectively with the front margin 115 and the inside face 114 of the rim 110.

Thereafter, the electronic and/or computer device 8 controls the axial and radial degrees of freedom Z and R of the feeler 10 simultaneously to provide a return force so that the feeler exerts a return force on the rim 110 that extends along the bisector of the V-shape of the bearing shoe 15, here at 45 degrees relative to the longitudinal axis A3.

Finally, the circumferential degree of freedom THETA of the feeler 10 is controlled at constant angular speed so that the bearing shoe 15 slides along the entire rim 110. The electronic and/or computer device 8 then reads simultaneously the axial position of the feeler and deduces therefrom the difference H1 between the height of the bottom of the bezel 111 and the height of the front margin 115 of the rim.

More precisely, it determines this difference H1 at each of the 360 felt or acquired points of the longitudinal profile P1. The set of these differences H1 then forms the above-mentioned geometrical characteristic.

In a fourth implementation, the geometrical characteristic H1 is acquired by optical feeling without making contact with the front margin 115 of the rim 110.

Such optical feeling may be performed by acquiring a three-dimensional digital image of the eyeglass frame 100 and by processing said numerical image electronically so as to identify the position of the front margin 115 of the rim 110 and deduce therefrom the difference H1 in height between the bottom of the bezel 111 and the rear margin 115 of the rim at each of the 360 felt or acquired points of the longitudinal profile P1. The set of these differences H1 then forms the above-mentioned geometrical characteristic.

In a fifth implementation, the geometrical characteristic H1 is acquired by searching for its value in a database registry provided for this purpose.

The database registry is preferably of the above-described type. It contains a plurality of records, each containing a reference to a type of eyeglass frame together with a geometrical characteristic that relates to the position of the bezel 111 relative to the front margin 115 of the rim 110 and that is specific to the frames of said type. In practice, the geometrical characteristic may be formed by a string of characters providing 360 height differences between the bottom of the bezel 111 and the rear margin 115 of each of said frames.

In order to acquire the geometrical characteristic, the optician then causes the computer to send a request to the database registry to search for a corresponding record, i.e. to search for a record having its reference corresponding to the reference of the eyeglass frame 100 selected by the wearer.

Thereafter, if a corresponding record is found, the registry returns the corresponding geometrical characteristic to the optician's computer.

In contrast, if no record is found corresponding to the selected eyeglass frame 100, then the optician acquires the geometrical characteristic by means of some other method and then writes a new record into the database registry associated with said eyeglass frame 100, said record containing the reference for the frame and the acquired geometrical characteristic.

To sum up, whatever the method selected, the electronic and/or computer device 8 has available at this stage the three-dimensional coordinates of the 360 points of the acquired longitudinal profile P1 and of the height difference H1 (as measured or approximated) between the bottom of the bezel 111 and the rear margin 115 of the rim at each of said 360 points.

Then, during the third step, the electronic and/or computer device 8 proceeds to calculate the shape of the deduced longitudinal profile P3 as a function of said data. The purpose is to ensure that, at the end of the step of shaping the lens to have this profile, the ophthalmic lens 120 can be engaged in the rim 110 in such a manner that the periphery of its front face 121 is flush with the front margin 115 of the rim 110.

The shape of this deduced longitudinal profile is defined herein by the three-dimensional coordinates of 360 characteristic points.

The radial and angular coordinates of these 360 points are calculated herein as a function of the radial and angular coordinates of the 360 points of the acquired longitudinal profile P1.

More precisely, they are calculated in such a manner that the projections of these acquired and deduced longitudinal profiles P1 and P3 onto the general plane of the frame 100 coincide or have the same shape but at a different scale.

The scale factor is calculated as a function of the shapes of the cross-sections of the bezel 111 and of the chamfering groove of the machining tool 132. This scale factor makes it possible to take account of the fact that, once said lens is engaged in the rim, the peak of its engagement ridge 123 (corresponding to the deduced longitudinal profile P3) is never in contact with the bottom of the bezel (corresponding to the acquired longitudinal profile P1), but is slightly offset therefrom.

The axial coordinates along the axis of rotation A1 of the 360 points of the deduced longitudinal profile P3 are calculated as a function of the axial coordinates of the 360 points of the longitudinal profile P1 and of the 360 corresponding differences H1.

Specifically, the axial coordinates of the 360 points of the deduced longitudinal profile P3 are calculated in such a manner that the front face 121 of the ophthalmic lens 120 comes flush with the front margin 115 of the rim 110 at a number N of cross-sections of the rim 110. It will be understood that given the shape differences between the bezel 111 and the outline of the front face 121 of the ophthalmic lens, it is not possible for the front face 121 of the lens to be flush with the front margin 115 of the rim over all of its outline.

This number N can be set by the user. In a variant, provision can be made for it to be calculated automatically so as to have a maximum value. In another variant, provision can be made for it to be calculated so that the mean of the differences between the outline of the front face 121 of the lens and the front margin 115 of the rim is minimized.

In the present example, the outline of the front face 121 of the ophthalmic lens 120 is said to be flush with the front margin 115 of the rim 110 at a given cross-section of the rim 110 whenever the edge of the front face 121 of the lens and the front margin 115 of the rim 110 in this section are situated at the same level along the axis of rotation A1 or are situated so as to extend each other.

Finally, during a fourth and last step, the shaper appliance 130 proceeds to shape the ophthalmic lens 120.

The support shafts 131 of the lens and/or the machining tool 132 are controlled for this purpose as a function of the shape of the deduced longitudinal profile P3 so as to form, on the edge face of the lens 120, the engagement ridge 123 with this profile.

By means of the invention, the crest of the engagement ridge 123 as obtained in this way extends at a distance from the front face 121 of the ophthalmic lens 120 that varies in a manner substantially identical to the manner in which the difference H1 between the front margin 115 and the bottom of the bezel 111 varies around the rim 110.

This ensures that once engaged in the rim 110, the front face 121 of the ophthalmic lens 120 is as flush as possible with the front margin 115 of the rim 110.

The present invention is not limited in any way to the implementation described and shown, and the person skilled in the art knows how to make any variant thereto in accordance with its spirit.

In particular, the invention finds an advantageous application when it is implemented by clients (opticians) referred to as "order givers" who subcontract the fabrication and the shaping of lenses.

More precisely, consideration is given here firstly to a client terminal installed beside a client for the purpose of ordering lenses, and secondly to a manufacturer terminal installed beside a lens manufacturer for fabricating and shaping lenses.

The client terminal includes computer means for recording and transmitting order data concerning the ophthalmic lens 120, e.g. via an Internet protocol (IP) type communications protocol. The order data comprises both prescription data for eyesight correction (e.g. data concerning optical power, centering, . . . ), and data relating to the frame.

The manufacturer terminal has computer means for receiving and recording the order data transmitted by the client terminal. It also has a device for fabricating the ophthalmic lens in compliance with the prescription data, e.g. comprising means for molding the lens and/or for machining at least one of the optical faces of the lens.

It also has a shaper appliance for shaping the ophthalmic lens in compliance with the data relating to the frame. The shaper appliance is designed in particular to implement the fourth step of the above-described method.

In a variant, provision can be made for the manufacturer terminal to be fitted solely with the shaper appliance and for the means for molding the lens and/or for machining at least one of the optical faces of the lens to be located with a manufacturer of unshaped lenses.

In any event, the lens preparation method is implemented in four stages.

During a first stage, the client implements the first two steps of the above-described method in order to acquire the shape data for the acquired longitudinal profile P1 together with said geometrical characteristic H1.

Then, during a second stage, the order data for a lens is sent via the client terminal. The order data comprises the optical prescription for the wearer together with said shape data and said geometrical characteristic.

During a third stage, the manufacturer receives the order data. This data may be received directly from the client terminal, in which case the manufacturer molds the lens and/or machines at least one of its optical faces, or else the manufacturer may receive the data from the manufacturer of unshaped lenses, in which case the order data is accompanied by an unshaped lens for shaping.

In any event, in order to calculate the shape of the two optical faces of the lens, it is preferable to take account not only of the prescription data for eyesight correction, but also said shape data and said geometrical characteristic so as to prepare a lens having the periphery of its front face that is suitable for coming as close as possible to being flush with the front margin of the frame.

Finally, during a fourth stage, the manufacturer calculates the shape of the deduced longitudinal profile P3 as a function of said shape data and as a function of said geometrical characteristic, implementing a method analogous to that described above. Finally, the ophthalmic lens 120 is shaped to have the deduced longitudinal profile P3.

In a variant, this method of preparing lenses could be implemented differently, using a database registry that is accessible from the client terminal and from the manufacturer terminal.

The registry would be analogous to those described above. It would have a plurality of records each associated with an eyeglass frame type and each containing a reference and a geometrical characteristic (relating to the position of the bezel relative to the front margin of the rim) that are specific to frames of the corresponding type. In practice, the geometrical characteristic is constituted by a string of characters comprising 360 height differences between the bottom of the bezel and the front margin of the frame. Preferably, each record also includes the three-dimensional coordinates of the 360 points of an acquired longitudinal profile.

In any event, during a first step, the client determines an eyeglass frame reference, e.g. corresponding to the name of the frame model, and then sends the reference to the manufacturer terminal, via the client terminal.

During a second step, the manufacturer searches the database registry for a record including said reference. The corresponding geometrical characteristic can then be read from the record. The three-dimensional coordinates of the 360 points of the corresponding acquired longitudinal profile can also be read, unless the client has already delivered the coordinates.

Thereafter, from these coordinates and from said geometrical characteristic, the manufacturer deduces the shape of the deduced longitudinal profile using a method of the type described above.

Finally, during a third step, the manufacturer shapes the ophthalmic lens to match the deduced longitudinal profile.

The description above relates to rimmed eyeglass frames. However the method as described is equally applicable to half-rimmed eyeglass frames.

It is recalled that such eyeglass frames have half-rims interconnected by a bridge and each provided with a temple. Each half-rim presents an inside face along which there runs an engagement ridge, lying between a rear margin that is to face towards the face of the wearer of the eyeglass frame, and an opposite, front margin.

The geometrical characteristic corresponding to the distance between the peak of the engagement ridge and the front margin of the half-rim may be acquired in particular using any of the implementations explained above.

The lens is then shaped with the help of a shaper appliance having a grooving grindstone, i.e. a grindstone presenting a projection, like a negative, with a machining profile that is complementary to the section of the engagement groove that is to be obtained in relief in the edge face of the lens to be machined.

Such a shaper appliance, well known to the person skilled in the art, is described for example in document FR 2 874 526 or in document EP 0 176 401, or its equivalent U.S. Pat. No. 4,640,055.

The invention claimed is:

1. A method of preparing an ophthalmic lens (120) for mounting in a surround (110) of an eyeglass frame (100), the surround (110) presenting a generally profiled shape with an inside face (114) provided with a first engagement ridge or groove (111) and lying between a rear margin (116) for being turned towards the face of the wearer of the eyeglass frame (100) and an opposite front margin (115), the method comprising:
a first acquisition step of acquiring the three-dimensional shape of an acquired longitudinal profile (P1) running along said inside face (114); and
a step of shaping the ophthalmic lens (120) so as to form on its edge face a second engagement ridge or groove (123) extending along a deduced longitudinal profile (P3) of three-dimensional shape that is calculated as a function of the shape of said acquired longitudinal profile (P1); wherein the method includes a second acquisition step of acquiring a geometrical characteristic (H1) relating to the position of the first engagement ridge or groove (111) relative to said front and/or rear margin (115 and/or 116) in an axial direction substantially perpendicular to a general plane of the eyeglass frame (100), and in that the shape of the deduced longitudinal profile (P3) is also calculated as a function of said geometrical characteristic (H1).

2. The method of preparation according to claim 1, wherein said geometrical characteristic (H1) comprises a distance relating to the position of the first engagement ridge or groove (111) relative to said front and/or rear margin (115 and/or 116) at least one given cross-section of the surround (110).

3. The method of preparation according to claim 1, wherein said geometrical characteristic (H1) comprises distances relating to the position of the first engagement ridge or groove (111) relative to said front and/or rear margin (115 and/or 116) at least ten given cross-sections of the surround (110).

4. The method of preparation according to claim 1, wherein the shape of the deduced longitudinal profile (P3) is calculated so that at the end of the shaping step, the ophthalmic lens (120) can be engaged in the surround (110) in such a manner that the periphery of its front face (121) is flush with the front margin (115) of the surround (110).

5. The method of preparation according to claim 1, wherein said second acquisition step is performed by rolling or sliding a feeler (10) along a generally longitudinal line (P2) of the front or rear margin (115 or 116) of the surround (110).

6. The method of preparation according to claim 5, wherein said feeler (10) has three degrees of freedom in movement (R, THETA, Z) for moving in the three dimensions of space, including freedom to move axially (Z) along said axial direction during said second acquisition step, and wherein the positions of the other two freedoms of movement (R, THETA) of said feeler (10) are controlled as a function of the shape of said acquired longitudinal profile (P1), and the axial freedom of movement (Z) of said feeler (10) is controlled independently of the shape of said acquired longitudinal profile (P1) to act in a return direction so that the feeler (10) remains in contact with the front or rear margin (115 or 116) of the surround (110).

7. The method of preparation according to claim 6, wherein said other two freedoms of movement (R, THETA) of the feeler (10) are controlled so that during said second acquisition step the feeler (10) remains in register with the first engagement ridge or groove (111), e.g. in register with the acquired longitudinal profile (P1) in said axial direction.

8. The method of preparation according to claim 5, wherein the feeler (10) is fitted with a read head (12) including a V-shaped bearing shoe (15), and said second acquisition step is performed by engaging said bearing shoe (15) against the surround (110), and by allowing it to slide there along in such a manner that two bearing zones (112, 113) of the bearing shoe (15) slide respectively over the front or rear margin (115 or 116) and against the inside face (114) of the surround (110).

9. The method of preparation according to claim 1, wherein said second acquisition step is performed by optically feeling the front or rear margin (115 or 116) of the surround (110).

10. The method of preparation according to claim 1, wherein said second acquisition step is performed by searching, in a database registry in which each record is associated with a reference eyeglass frame type and contains a geometrical characteristic specific to said eyeglass frame type and relating to the position of the engagement ridge or groove relative to the front and/or rear margin of the surround, for a record corresponding to said eyeglass frame (100), and in reading said associated geometrical characteristic (H1).

11. The method of preparation according to claim 10, wherein, if no record corresponding to said eyeglass frame (100) is found, said geometrical characteristic (H1) is acquired by rolling or sliding a feeler (10) along the front and/or rear margin (115 or 116) of said surround (110) and by writing said acquired geometrical characteristic (H1) in a new record of the database registry in association with said eyeglass frame (100).

12. The method of preparation according to claim 1, wherein the first acquisition step is performed by mechanically feeling along said first engagement ridge or groove (111) or by optically feeling along said first engagement ridge or groove (111).

13. The method of preparation according to claim 1, wherein the first acquisition step is performed by reading a record in a database registry in which each record is associated with a reference eyeglass frame type and contains the three-dimensional shape of an acquired longitudinal profile specific to said reference eyeglass frame type.

14. The method of preparation according to claim 1, implemented by means of a system comprising firstly a client terminal installed beside a client and including computer means for computing and transmitting order data concerning an ophthalmic lens (120), said order data comprising data relating to said eyeglass frame (100), and secondly a manufacturer terminal installed beside a manufacturer and including computer means for receiving and recording the order data transmitted by the client terminal, and a shaper device for shaping said ophthalmic lens (120) and designed to implement said shaping step, said second acquisition step comprising:
  a step of the client determining said geometrical characteristic (H1); and
  a step of the client terminal sending control data, said data incorporating said geometrical characteristic (H1); and
  a step of the manufacturer terminal receiving at least part of said control data, said part incorporating said geometrical characteristic (H1).

15. The method according to claim 1, implemented by means of a system comprising firstly a client terminal installed beside a client and including computer means for computing and transmitting order data concerning an ophthalmic lens (120), said order data comprising data relating to said eyeglass frame (100), and secondly a manufacturer terminal installed beside a manufacturer and including computer means for receiving and recording the order data transmitted by the client terminal, and a shaper device for shaping said ophthalmic lens (120) and designed to implement said shaping step, said second acquisition step comprising:
  a step of the client reading a reference for said eyeglass frame (100);
  a step of the client terminal sending order data, the order data incorporating said reference;
  a step of the manufacturer terminal receiving said order data; and
  a step of the manufacturer terminal searching in a database registry in which each record is associated with a reference eyeglass frame type and contains a reference of said eyeglass frame type and a geometrical characteristic relating to the position of the engagement ridge or groove relative to the front and/or rear margin of the surround specific to said eyeglass frame type, for a record associated with the reference read for said eyeglass frame (100).

* * * * *